US011023795B2

(12) United States Patent
Marin Palacios et al.

(10) Patent No.: US 11,023,795 B2
(45) Date of Patent: Jun. 1, 2021

(54) TAG SYSTEM AND METHOD FOR LONG-DISTANCE DETECTION OF OBJECTS

(71) Applicant: Universidad Complutense de Madrid, Madrid (ES)

(72) Inventors: María Pilar Marin Palacios, Madrid (ES); Antonio Hernando Grande, Madrid (ES)

(73) Assignee: UNIVERSIDAD COMPLUTENSE DE MADRID, Madrid (ES)

( * ) Notice: Subject to any disclaimer, the term of this patent is extended or adjusted under 35 U.S.C. 154(b) by 299 days.

(21) Appl. No.: 16/093,461

(22) PCT Filed: Mar. 27, 2017

(86) PCT No.: PCT/ES2017/000035
§ 371 (c)(1),
(2) Date: Oct. 12, 2018

(87) PCT Pub. No.: WO2017/178668
PCT Pub. Date: Oct. 19, 2017

(65) Prior Publication Data
US 2020/0265280 A1     Aug. 20, 2020

(30) Foreign Application Priority Data
Apr. 13, 2016    (ES) ................ ES201600298

(51) Int. Cl.
*G06K 19/06*     (2006.01)
*G01V 15/00*     (2006.01)
*G08B 13/24*     (2006.01)

(52) U.S. Cl.
CPC ....... *G06K 19/06196* (2013.01); *G01V 15/00* (2013.01); *G08B 13/2408* (2013.01); *G08B 13/2471* (2013.01)

(58) Field of Classification Search
CPC ............ G08B 13/2442; G08B 13/2408; G08B 13/2471; G06K 19/06196; G06K 19/0672;
(Continued)

(56) References Cited

U.S. PATENT DOCUMENTS 4,510,489 A    4/1985   Anderson, III et al.
4,654,641 A *   3/1987   Ferguson .............. G01S 13/753
                                               327/117
(Continued)

FOREIGN PATENT DOCUMENTS

ES         2317769 A1     4/2009
FR          763681 A      5/1934
(Continued)

OTHER PUBLICATIONS

Marin, et al., "High-Frequency Behavior of Amorphous Microwires and Its Aapplications", Journal of Magnetism and Magnetic Materials, Apr. 1, 2005, Elsevier, Amsterdam, NL, 4 pages.
(Continued)

*Primary Examiner* — Daniel I Walsh
(74) *Attorney, Agent, or Firm* — Shackelford, Bowen, McKinley & Norton, LLP

(57) ABSTRACT

The present invention describes a tag comprising a magnetic element in the form of a microwire of 80-250 microns with giant magnetoimpedance which, when joined to an object, allows for the wireless detection of same by modulating the reflectivity of the microwire. Detection is performed by using a system that emits an electromagnetic wave that has a frequency between 1 and 20 GHz and a low frequency magnetic field (0.01-50 Hz), and detects the modulation of the reflectivity of the microwire. Thus, objects at distances greater than 1 m can be detected.

8 Claims, 5 Drawing Sheets

(58) Field of Classification Search
CPC .......... G06K 19/06187; G06K 19/045; G06K 19/0723; G06K 19/06046; H01F 1/15391; G01V 15/00
See application file for complete search history.

(56) References Cited

U.S. PATENT DOCUMENTS

| | | | |
|---|---|---|---|
| 4,660,025 A | 4/1987 | Humphrey | |
| 4,686,516 A | 8/1987 | Humphrey | |
| 4,980,670 A | 12/1990 | Humphrey et al. | |
| 5,003,291 A * | 3/1991 | Strom-Olsen | G09F 3/00 340/551 |
| 5,313,192 A | 5/1994 | Ho et al. | |
| 5,499,013 A * | 3/1996 | Konotchick | G08B 1/08 340/539.22 |
| 5,519,379 A * | 5/1996 | Ho | G08B 13/2408 148/121 |
| 5,605,768 A * | 2/1997 | Furukawa | G08B 13/2408 156/272.4 |
| 5,680,106 A * | 10/1997 | Schrott | G06K 19/0672 340/10.33 |
| 5,729,201 A * | 3/1998 | Jahnes | G06K 19/06187 235/493 |
| 5,825,290 A * | 10/1998 | Lian | G08B 13/2408 340/572.6 |
| 5,831,532 A * | 11/1998 | Gambino | G06K 19/06187 340/572.1 |
| 5,835,016 A * | 11/1998 | Ho | G08B 13/2408 340/568.1 |
| 5,870,328 A * | 2/1999 | Mohri | G01R 33/02 335/296 |
| 5,912,622 A * | 6/1999 | Endo | B62H 5/20 340/572.5 |
| 6,011,475 A * | 1/2000 | Herzer | C21D 1/04 340/572.6 |
| 6,177,870 B1 * | 1/2001 | Lian | G08B 13/2411 340/572.1 |
| 6,208,253 B1 * | 3/2001 | Fletcher | G01K 7/38 324/200 |
| 6,225,905 B1 * | 5/2001 | Tyren | G01V 15/00 340/551 |
| 6,232,879 B1 * | 5/2001 | Tyren | G01V 15/00 340/568.1 |
| 6,356,197 B1 * | 3/2002 | Patterson | G06K 7/0008 340/572.1 |
| 6,492,746 B1 * | 12/2002 | Hernando Grande | B60M 1/06 174/32 |
| 6,507,262 B1 * | 1/2003 | Otte | H01F 1/15333 336/213 |
| 6,747,559 B2 * | 6/2004 | Antonenco | G08B 13/2408 148/300 |
| 7,852,215 B2 * | 12/2010 | Marin Palacios | G08B 13/2442 340/572.1 |
| 8,302,872 B2 * | 11/2012 | Mullen | G06Q 20/20 235/493 |
| 9,847,217 B2 * | 12/2017 | Morrisroe | F23C 99/003 |
| 10,254,499 B1 * | 4/2019 | Cohen | B23K 1/19 |
| 2002/0057201 A1 * | 5/2002 | Manov | G08B 13/2442 340/572.1 |
| 2002/0122956 A1 * | 9/2002 | Ono | C22C 38/10 428/810 |
| 2002/0125546 A1 * | 9/2002 | Muta | G06K 19/0775 257/531 |
| 2002/0187504 A1 * | 12/2002 | Reich | G01N 33/553 435/6.19 |
| 2003/0197576 A1 * | 10/2003 | Dionne | H01P 1/215 333/99 S |
| 2004/0070502 A1 * | 4/2004 | Tyren | G08B 13/2448 340/572.6 |
| 2004/0207528 A1 * | 10/2004 | Fabian | G08B 13/2408 340/572.6 |
| 2004/0228171 A1 * | 11/2004 | Ho | G11C 11/16 365/158 |
| 2005/0109435 A1 * | 5/2005 | Liebermann | G06K 19/06018 148/561 |
| 2005/0242955 A1 * | 11/2005 | Lian | G08B 13/244 340/572.6 |
| 2005/0242956 A1 * | 11/2005 | Sorkine | G08B 13/2442 340/572.6 |
| 2006/0121316 A1 * | 6/2006 | Tomka | C23C 18/1879 428/826 |
| 2007/0010702 A1 * | 1/2007 | Wang | A61F 2/82 600/8 |
| 2007/0040551 A1 * | 2/2007 | Ciureanu | G01R 33/02 324/244 |
| 2007/0096913 A1 * | 5/2007 | Marin Palacios | G08B 13/2411 340/572.3 |
| 2007/0114786 A1 * | 5/2007 | Antonenco | G06K 19/06187 283/70 |
| 2007/0263699 A1 * | 11/2007 | Clothier | H05B 6/062 374/163 |
| 2008/0015570 A1 * | 1/2008 | Ormsby | A61B 18/1492 606/41 |
| 2008/0072423 A1 * | 3/2008 | Finn | G06K 19/07779 29/854 |
| 2008/0136571 A1 * | 6/2008 | Peter | H01F 7/06 335/306 |
| 2008/0143533 A1 * | 6/2008 | Marin Palacios | H01F 1/15316 340/572.5 |
| 2008/0272788 A1 * | 11/2008 | McDowell | G01R 33/3628 324/322 |
| 2008/0314984 A1 * | 12/2008 | Alexandru | G06K 7/082 235/449 |
| 2009/0146658 A1 * | 6/2009 | McDowell | G01R 33/465 324/309 |
| 2009/0195386 A1 * | 8/2009 | Peter | G08B 13/2437 340/572.1 |
| 2010/0006562 A1 * | 1/2010 | Clothier | G01K 1/024 219/494 |
| 2014/0152416 A1 * | 6/2014 | Herzer | C22C 38/12 336/233 |
| 2014/0361627 A1 * | 12/2014 | Kurs | H02J 50/50 307/104 |
| 2015/0021402 A1 * | 1/2015 | Finn | H01Q 1/2216 235/492 |
| 2015/0235122 A1 * | 8/2015 | Finn | H05K 1/0233 235/439 |
| 2018/0142423 A1 * | 5/2018 | Manov | D21H 21/40 |
| 2019/0197385 A1 * | 6/2019 | Finn | G06K 19/07783 |
| 2019/0223975 A1 * | 7/2019 | Agostinelli | A61B 5/062 |

FOREIGN PATENT DOCUMENTS

| | | |
|---|---|---|
| WO | 0213210 A2 | 2/2002 |
| WO | 2016012636 A1 | 1/2016 |
| WO | WO-2016012636 A1 | 1/2016 |

OTHER PUBLICATIONS

International Application No. PCT/ES2017/000035, International Search Report dated May 8, 2017. 2 pages.

* cited by examiner (a)

(b)

TAG SYSTEM AND METHOD FOR LONG-DISTANCE DETECTION OF OBJECTS

TECHNICAL FIELD

The present invention lies within the field of the detection of objects by means of electromagnetic fields. More specifically, the invention relates to a tag that is wirelessly detectable at long distances by an active element and a complementary element, both magnetic, as well as to the system and detection method for objects using said tag.

STATE OF THE ART

The present invention relates to a system for the long-distance electronic detection of objects based on the influence of magnetic phenomena in the reflectivity of GHz waves, encompassing in particular tags that can be activated or deactivated and the detection system and method of the same.

Systems for detecting articles based on magnetic materials are well known. Patent FR763681 shows the first device of this type. The device described is based on the use of a tape made of soft magnetic material of the permalloy type which, when subjected to an alternating magnetic field, induces harmonics in a detector that are clearly different from those coming from other types of metals.

The amorphous magnetic materials in the form of a tape have low coercive fields and high susceptibility that can be optimized to be used in equipment for the electronic detection of articles by means of suitable heat treatment in the presence or not in the presence of a magnetic field. Patent WO0213210 relates to the use of compositions based on CoNiFeSiBC.

U.S. Pat. No. 4,660,025 shows a detector system in which an amorphous bistable magnetic wire with a minimum length of 7.6 cm is used as a tag. In this case, an alternating magnetic field is applied to a specific region of the space and an alarm is activated when a perturbation of said magnetic field is detected. This is produced when the tag is introduced in that region and the value of the magnetic field exceeds the critical field of the wire, causing the magnetization to reverse. This is known as snap action. One drawback of these systems is the long length of the tag.

In addition to the advantages obtained in the tag of U.S. Pat. No. 4,660,025 and which relate to the high harmonic content and high pulse thereof, it is important to find the way of deactivating these types of magnetic materials. U.S. Pat. No. 4,686,516 shows a way of doing so based on the crystallization of the amorphous magnetic material. This is done by heating at least a part of the tag to a temperature above the crystallization temperature, either by applying an electric current or radiant energy, such as a laser. Although some of the methods herein described allow the tag to be deactivated without touching it, they need to be carefully applied.

U.S. Pat. No. 4,980,670 shows a magnetic marker for electronic surveillance of articles wherein the tag has "snap action" for values below the threshold of the applied magnetic field and, furthermore, the tag is easily deactivated.

U.S. Pat. No. 5,313,192 develops a tag equivalent to the one described in document U.S. Pat. No. 4,980,670 yet it is more stable and controllable. The processing conditions of the amorphous magnetic tape are the same but, furthermore, the tag is subjected to predetermined magnetic fields during processing which allow it to be activated and deactivated. More particularly, the tag of this invention contains a soft magnetic material that makes up the main core and a second hard or semi-hard magnetic material. This tag is conditioned such that the second material has activated and deactivated states, respectively. In the activated state, the tag demonstrates bistable hysteresis, while in the deactivated state the tag has a hysteresis loop without Barkhausen jumps.

U.S. Pat. No. 6,747,559 relates to a permanent tag for the electronic detection of articles based on magnetic microwires with a low coercivity (less than 10 A/m) and high magnetic permeability (greater than 20,000). The length of the microwire or microwires used is not greater than 32 mm. In this case, it is the high permeability that allows for high harmonics with large amplitude for sufficiently low values of the applied field, thereby making the tag easier to distinguish.

U.S. Pat. No. 7,852,215 has a tag based on magnetic microwires in order to function according to the induction method of an equivalent mode to the one described in U.S. Pat. No. 6,747,559.

All of the systems described are based on the generation of harmonics and have a clear limitation in the distance of detection, limited to 90 cm. Another limitation is the difficulty in detecting signals coming from other types of metals.

There are systems that allow for detection at a greater distance, never greater than two meters, based on magnetoelastic resonance, such as that which is claimed by U.S. Pat. No. 4,510,489. It uses magnetomechanical tags based on magnetostrictive elements that oscillate in the presence of an alternating magnetic field of the mechanical resonance frequency. An equivalent system, but one using magnetoelastic microwires is that which is described by patent ES2317769 (B1).

Another limit of these systems is the size of the tag used. U.S. Pat. No. 6,232,879 bases the remote detection of objects on a tag made up of at least two elements in a specific relative position, which limits the size and the geometry of the tag.

Thus, there is a need to develop tags that have a smaller size and which are easily detectable at longer distances.

DETAILED DESCRIPTION OF THE INVENTION

Figure 1:
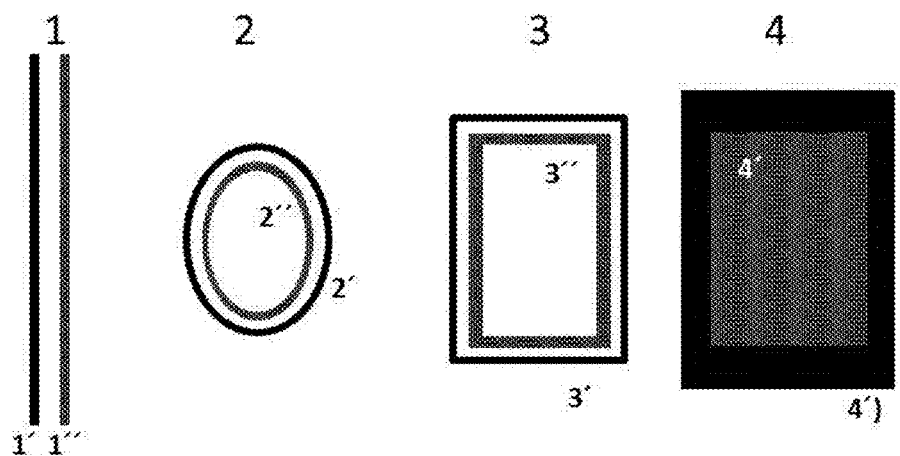
FIG. 1 shows diagrams corresponding to different tag configurations: wire (1) with soft magnetic wire (1') and (11'), ring (2), (2') and (2"), square (3), (3') and (3") and microwire powder (4).
Figure 2:
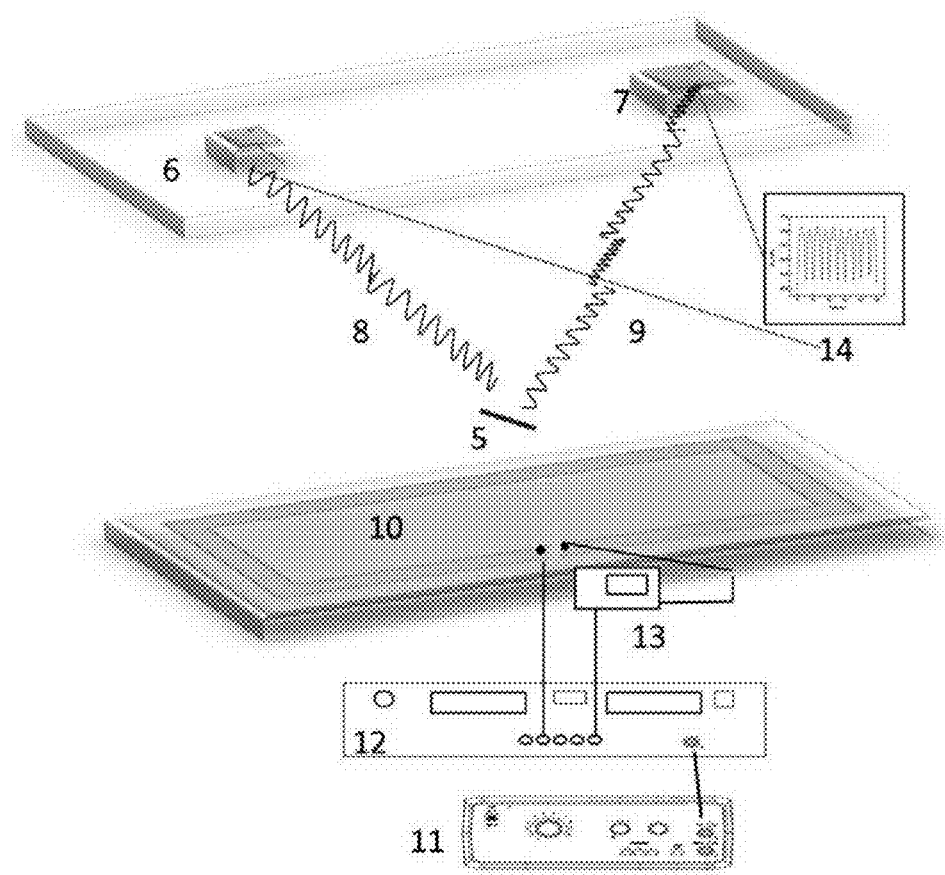
FIG. 2 shows a diagram of the electromagnetic circuit with the following elements: tag with microwire (5) transmitting antenna (6), receiving antenna (7) emitted wave (8), modulated wave (9), coil with low frequency field (10), function generator (11), amplifier (12), ammeter (13) and vector signal analyzer (14).

Tag, system and method for long-distance detection of objects.

This patent presents the possibility of a magnetic microwire as a short-length sensor element which is detectable at long distances (greater than 1 meter), the detectability of which is conditioned by the relationship between its coercive field and frequency.

The invention relates to a tag made up of an active element and, optionally, a complementary element, both magnetic, which allows for the wireless long-distance detection thereof, by modulating the reflectivity of the active element.

The active element is a soft magnetic microwire with a diameter in a range from 80 to 200 microns, with giant magnetoimpedance and a length conditioned by the transmission frequency of the antennas in such a way that, for excitation frequencies between 1 and 20 GHz, the length of the element to be detected is between 30 and 1 cm; more precisely, for a frequency of 3 GHz a sensor element of 5 cm would be used and for 1.5 GHz, a sensor element of 10 cm would be used.

The coercive field of the microwire depends on the frequency of this low frequency field. Said magnetic microwire must have a non-bistable hysteresis loop with transverse anisotropy in a range of 10 to 20 Oe and the coercive field thereof comprised between 1 and 5 Oe for frequencies of a low frequency exciter field between 10 and 50,000 mHz, but never greater.

The microwire can be an extended microwire or a closed microwire, for example in the form of a ring, square or rectangle, with one or more turns, or be in microwire powder form.

In greater detail, the active element is a borosilicate glass-coated magnetic microwire with a composition based on iron and cobalt, for example, $Fe_xCo_{a-x-y}Ni_ySi_zB_wM_t$ (where a+z+w+t=100, 70≤a−x−y≤75, 0≤x+y≤5, 0≤z+w≤25, 0≤t≤3, M=Nb, Mo, Hf) the magnetostriction constant being virtually null, the values of which are comprised between −1 ppm and −0.05 ppm, with an anisotropy field no less than 10 Oe and no greater than 20 Oe and with a diameter of the metal core at a value comprised between 30 and 250 microns. Its composition can be amorphous or nanocrystalline with a coercive field between 0.5 and 250 Oe (for low frequency exciter field frequencies of 0.001 and 50 Hz, never greater) with giant magnetoimpedance properties, with a wire geometry, ring, coil, rectangular circuit or magnetic microwire powder, wherein the electric resonance frequency of those geometries is conditioned by the geometric parameters thereof in the frequency interval of 1 to 20 GHz.

The dimensions of the wire are comprised between 30 and 1 cm, the diameter of the ring between 0.5 and 10 cm, the side of the rectangle between 0.5 and 10 cm or the length of the powder microwires between 1 and 5 mm.

The magnetic permeability, due to the low magnetic anisotropy of the microwire, is easily modifiable by applying a magnetic field.

Furthermore, the coercive field of the wire of the active element increases when the frequency of the low frequency field increases and the maximum variation in the reflectivity of the active element is produced for low frequency fields associated with coercive fields of the active element between 1 and 20 Hz.

The coercive field of the active element is controlled by the composition of the wire and nanocrystallization heat treatments.

The magnetoimpedance effect between 20 and 50% is controllable by the nanocrystallization percentage between 0 and 10%.

The second element (complementary element) can be a magnetic wire with a diameter greater than 100 microns or a magnetic tape or a magnetic powder, the remanence of which is such that, in the proximity of the soft microwire, it creates a magnetic field around the coercive field thereof at the frequency of the exciter field.

The presence of this second magnetic element with magnetization such that it generates a magnetic field in the proximity of the microwire which is equivalent to the coercive field thereof maximizes the reflectivity of the microwire.

Moreover, this second element can also be used as a deactivator of the tag because, once the tag is used, the state of magnetization thereof can be modified by applying an intense magnetic field and causing the tag to be deactivated.

Another aspect of the invention relates to a long-distance detection system for objects by means of wireless detection of the previously described microwire. The detection system consists of a transmitting system connected to a transmitting antenna and a receiving system connected to a receiving antenna. The transmitting antenna transmits a wave with a fixed frequency between 0.5 and 6 GHz. A wave polarizer, used rotationally or in one direction to ensure that the electric field of the wave is in the axial direction of the element to be detected, and a low frequency signal generator system, comprised between 10 and 50,000 mHz (never greater), connected to coils for the creation of a magnetic field with alternating modulation at low frequency to which, optionally, a continuous field in the area of detection is superposed, are utilized. All of the above is controlled by a controller system connected to the transmitting device, to the receiver and to the low frequency signal generator. The receiving system collects the variations in the reflectivity of the element to be detected, modulated by the superposition of the continuous and low frequency magnetic fields, respectively.

The detection system comprises a first electric circuit fed by a low frequency sinusoidal signal with which another direct current (DC) can be superposed, which feeds a coil, able to be camouflaged with the floor, which generates a magnetic field below the anisotropy field of the microwire used. Said current allows for periodic magnetization and demagnetization of the soft magnetic microwire placed on the tag. The system comprises a second circuit that is used to transmit and receive, by means of both transmitting and receiving antennas, a high frequency signal such that the frequency coincides with the electric resonance frequency of the chosen microwire. Furthermore, the system comprises means for processing the signal, establishing a detection threshold.

A third aspect of the invention relates to the long-distance detection method of objects using the described tag. It is based on the modulation, by means of the magnetic microwire, of the wave transmitted by the transmitting antenna. This modulation is due to the variations of the coefficient of reflectivity of the microwire in the presence of an alternating low frequency magnetic field and is at the maximum when the greatest variation in permeability of the microwire that coincides with the coercive field thereof is produced.

For this specific case, the coefficients of dispersion of the electromagnetic wave, due to magnetic susceptibility, are simultaneously modified by:

the frequency of the alternating magnetic field generated by the electric circuit (in other words, the first circuit of the detection system) and involves the periodic magnetization of the microwire, with a frequency between 0.01 and 50 Hz, the optimum frequencies for detection always being below a specific value that is conditioned by the microstructure of the wire. In the case of an amorphous microstructure, the optimum frequencies would be lower than 10 Hz and in the case of a crystalline microstructure, 20 Hz.

the amplitude of the alternating magnetic field generated by the electric circuit (in other words, the first circuit of the detection system) and involves the periodic magnetization of the microwire, with a frequency between 0.01 and 50 Hz, the optimum amplitudes for detection being lower than the anisotropy fields of the wires and comprised between half of the anisotropy and the anisotropy field itself.

The detection of the tag is done by modulating the reflectivity of the active element (the microwire) thereof with respect to the electromagnetic waves of frequencies between 1 and 20 GHz, using, for such purposes, a low frequency magnetic field that can be between 0.01 and 50 Hz. The amplitude of the field is comprised between 0 and 25 Oe.

The modulation of the reflectivity of the microwire is done with the frequency of this low frequency field and is a result of the effect of the giant magnetoimpedance experienced by the active element.

Furthermore, the maximum variation in the reflectivity of the active element is produced for the electric resonance frequencies thereof conditioned by the geometry (length in the case of a wire, diameter in the case of a ring and lengths of the sides in the case of a square or a rectangle).

This modulation of the reflectivity of the active element involves the modulation of the GHz wave in the presence of said element and the detection thereof is done by means of an antenna by the modulated wave in GHz in the presence of a magnetic active element subjected to a low frequency magnetic field.

The generation of the low frequency magnetic field can be done, for example, by means of rectangular coils camouflaged in the floor and the generation and detection GHz waves can be done by means of a camouflaged system of antennas on the ceiling.

EMBODIMENTS OF THE INVENTION

The present invention is additionally illustrated by the following example which is not limiting in the scope thereof.

Figure 3:
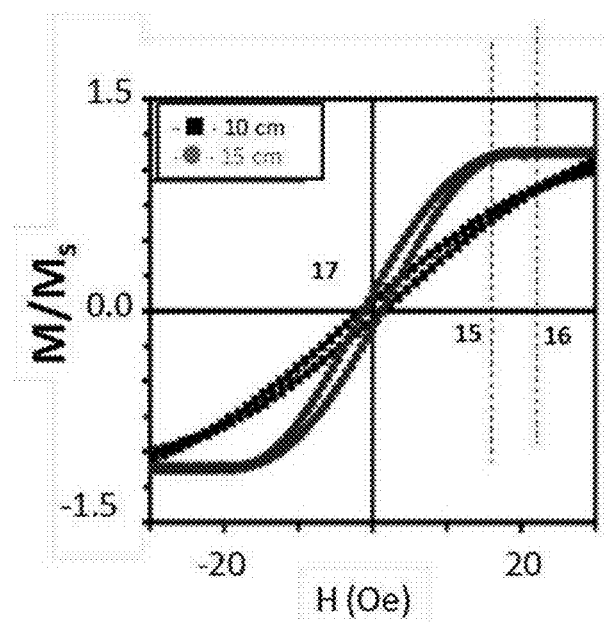
FIG. 3 shows the hysteresis loops, obtained by the method of induction at 10 Hz, associated with two microwires of 10 and 15 cm with the required parameters of the anisotropy field with values in this case of 17 Oe (15) and 22 Oe (16), respectively, and of coercive field of 1 Oe (17).
Figure 4:
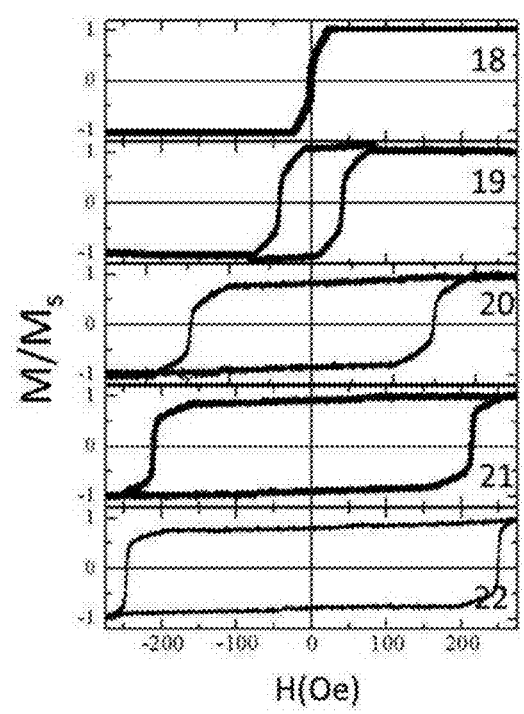
FIG. 4 shows the hysteresis loops corresponding to a 15 cm wire at different frequencies: 10 Hz (18), 20 Hz (19), 30 Hz (20), 40 Hz (21) and 50 Hz (22).
Figure 5:
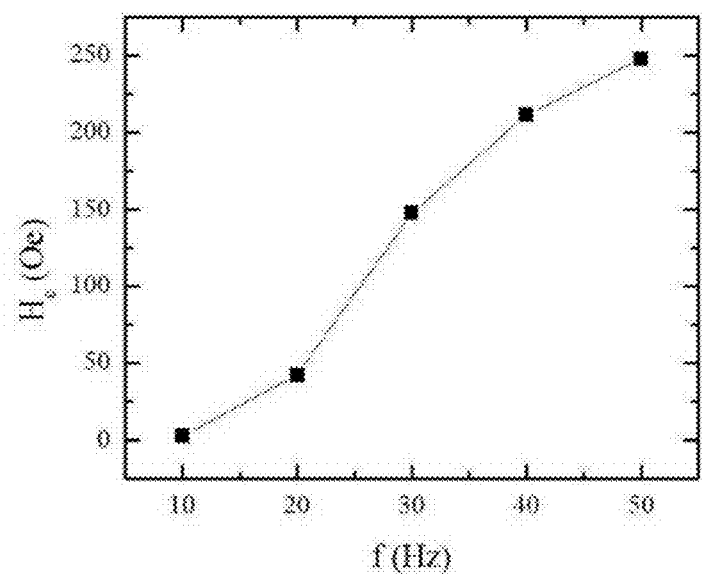
FIG. 5 shows the evolution of the coercive field with the frequency for a wire of 15 cm.
Figure 6:
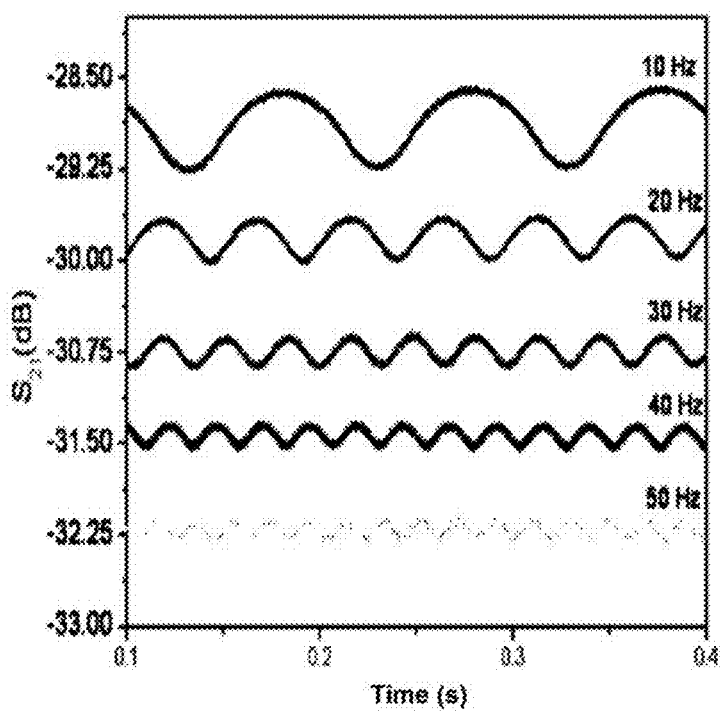
FIG. 6 shows the reflectivity as a function of time detected by the antenna (6) and the modulated wave (9) associated with the frequency of the low frequency field for a wave frequency transmitted by the antenna of 2.37 GHz and an applied low frequency field of 2.5 Oe.
Figure 7:
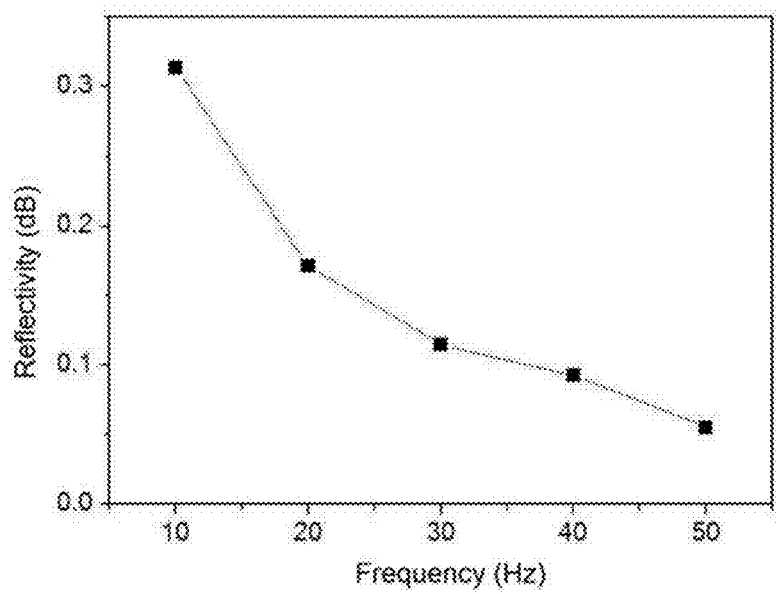
FIG. 7 shows the evolution of the maximum reflectivity as a function of the frequency of the low frequency field of 2.5 Oe for the 2.37 GHz wave.

A tag formed by two parallel wires that are 15 cm long is selected, the composition thereof being FeCoSiB, one of the wires having an amorphous structure and the other a crystalline wire structure. The hysteresis loops are carried out at different frequencies to determine the coercive field thereof as a function of the frequency (FIG. 3).

Figure 8:
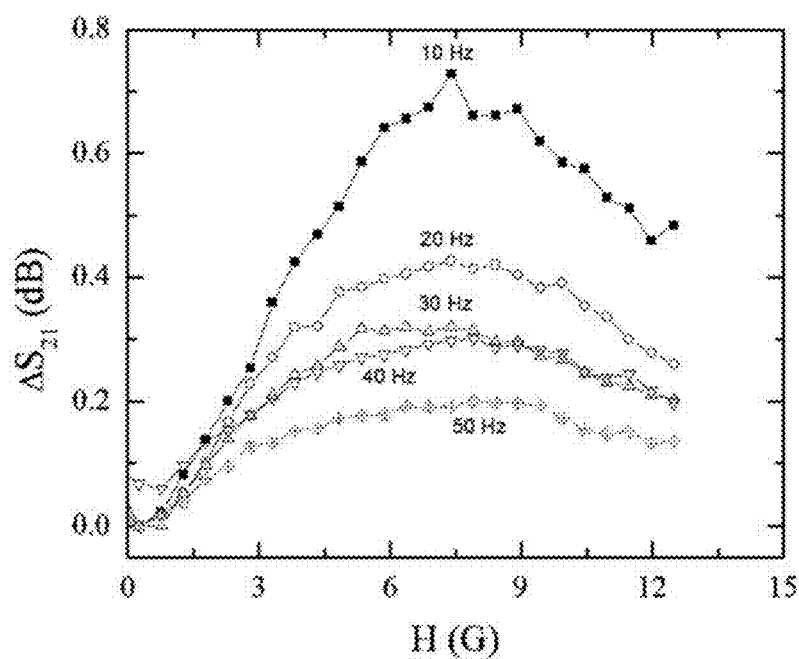
FIG. 8 shows the evolution of the maximum reflectivity for the frequencies comprised between 10 and 50 Hz when a continuous magnetic field is applied.
Figure 9:
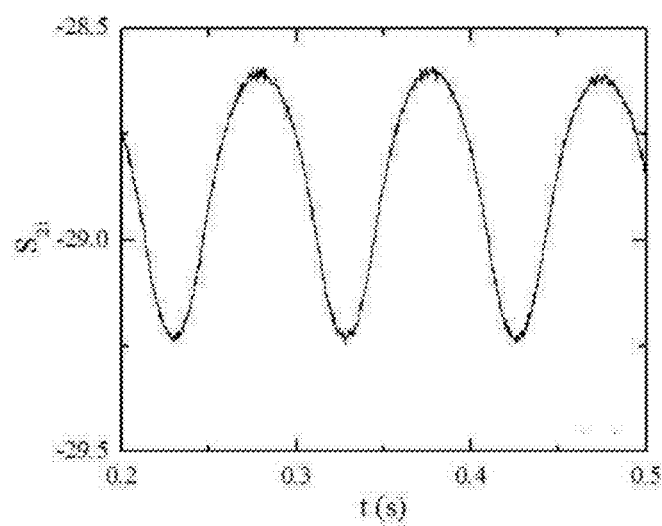
FIG. 9 shows the maximum reflectivity as a function of time for two microwires, one soft and the other hard: with the wire demagnetized (a) and saturated (b).
Figure 9:
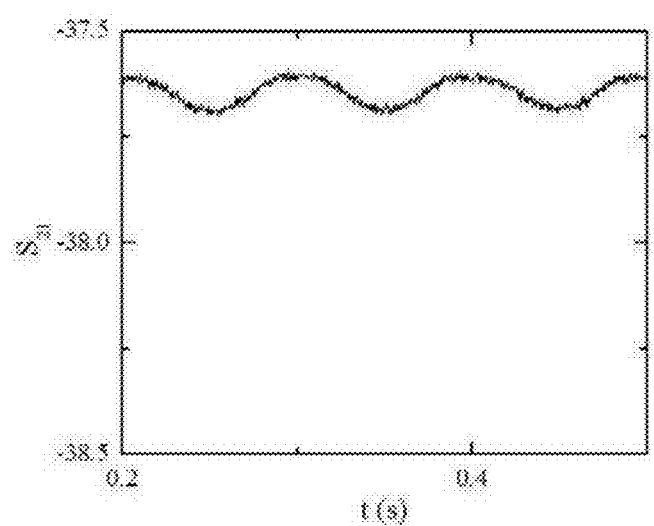

The transmitting and receiving antennas are connected to a vector signal analyzer working at a frequency of 2.37 GHz. By means of coils, a low frequency magnetic field between 10 and 50 Hz with a maximum amplitude of 2.5 Oe is generated. For the demagnetized hard wire, the evolution of the reflectivity as a function of time according to the frequency of the low frequency field (FIG. 9) and the evolution of the reflectivity with the value of the DC field superposed with that of low frequency (FIG. 8) are measured and, for the magnetized hard wire the reflectivity is measured as a function of the frequency (FIG. 9).

The detection of the microwire is done based on the amplitude of the detected signal and the variation thereof with respect to that which is observed in the absence of the same. The amplitude of the signal is greater the smaller the frequency of the low frequency field. In the presence of a magnetically hard wire, it is possible to reduce the voltage of this signal, which would result in the deactivation of the tag.

The invention claimed is:

1. A system for long-distance detection of an object, the system comprising:
    a tag comprising a magnetically soft microwire with a diameter between 80 and 250 microns, with giant magnetoimpedance properties, with a non-bistable hysteresis loop with transverse anisotropy between 10 and 20 Oersted (Oe), a coercive field between 1 and 5 Oe for a low frequency exciter field with frequencies from 10 to 50,000 millihertz (mHz) and an amplitude between 0 and 25 Oe and the electric resonance frequency in high frequency thereof being conditioned by the geometric parameters thereof for excitation frequencies between 1 and 20 gigahertz (GHz), the tag being associated with the object;
    a transmitting sensor connected to a transmitting antenna that transmits a wave with a frequency between 1 and 20 GHz;
    a generator system generating low frequency signals comprised between 10 and 50,000 mHz for creation of a magnetic field with low frequency alternating modulation with which a continuous field in the area of detection is superposed;
    a receiver system which collects variations in the reflectivity of a microwire of the tag, modulated by superposition of the continuous and low frequency magnetic fields, respectively; and
    a controller system connected to the transmitting sensor, to the receiver system, and to the generator system.

2. The system according to claim 1, further comprising:
    a first electric circuit fed by a low frequency sinusoidal signal with which another direct current (DC) is superposed which feeds a coil, able to be camouflaged with a floor, which generates a magnetic field lower than an anisotropy field of the microwire used; wherein a current allows for periodic magnetization and demagnetizaion of the microwire placed on the tag;
    a second circuit for transmitting and receiving, by means of both transmitting and receiving antennas, a high frequency signal such that a frequency coincides with the electric resonance frequency of the chosen microwire; and
    a means for processing the signal and establishing a detection threshold.

3. The system according to claim 1, wherein the frequency of the low frequency magnetic field to be used is determined by an evolution with a frequency of a coercive field of the microwire to be detected.

4. The system according to claim 2, wherein the generation of the low frequency magnetic field is done by means of coils that are camouflaged with the floor.

5. The system according to claim 2, wherein the generation and the detection of the waves is done by means of coils that are camouflaged with the floor.

6. A method for the long-distance detection of objects, the detection of which is done by modulating reflectivity of a microwire of a tag, the tag comprising a magnetically soft microwire with a diameter between 80 and 250 microns, with giant magnetoimpedance properties, with a non-bistable hysteresis loop with transverse anisotropy between 10 and 20 Oersted (Oe), a coercive field between 1 and 5 Oe for a low frequency exciter field with frequencies from 10 to 50,000 millihertz (mHz) and an amplitude between 0 and 25 Oe and the electric resonance frequency in high frequency thereof being conditioned by the geometric parameters thereof for excitation frequencies between 1 and 20 gigahertz (GHz), the detection based on superposition of continuous and low frequency magnetic fields, the method comprising:

transmitting an electromagnetic wave with a frequency between 1 and 20 GHz;

creating an alternating low frequency magnetic field, which has a frequency between 10 and 50000 mHz and an amplitude between 0 and 25 Oe;

superposing a direct current (DC) with the alternating low frequency magnetic field which generates a magnetic field below an anisotropy field of a microwire used; and measuring the reflectivity of the microwire as a function of time and frequency of the low frequency field.

7. The method according to claim 6, wherein the modulation of the reflectivity of the microwire involves the modulation of the GHz wave in the presence of said microwire and the detection thereof is based on an antenna by the modulated wave in GHz in the presence of a magnetic active element subjected to a low frequency magnetic field.

8. The method according to claim 6, wherein maximum detection is produced for a smallest possible frequency of the low frequency field.

\* \* \* \* \*